United States Patent
Takizawa et al.

(10) Patent No.: US 8,569,698 B2
(45) Date of Patent: Oct. 29, 2013

(54) THERMAL DETECTOR, THERMAL DETECTION DEVICE, AND ELECTRONIC INSTRUMENT

(75) Inventors: Jun Takizawa, Nagano (JP); Takafumi Noda, Nagano (JP); Taketomi Kamikawa, Nagano (JP); Mitsuhiro Yamamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 223 days.

(21) Appl. No.: 13/186,775

(22) Filed: Jul. 20, 2011

(65) Prior Publication Data

US 2012/0018635 A1  Jan. 26, 2012

(30) Foreign Application Priority Data

Jul. 26, 2010 (JP) .................................. 2010-167516

(51) Int. Cl.
*G01J 5/00* (2006.01)
(52) U.S. Cl.
USPC ....................................................... 250/338.3
(58) Field of Classification Search
USPC ....................................................... 250/338.3
See application file for complete search history.

(56) References Cited

U.S. PATENT DOCUMENTS

| 6,031,231 A | 2/2000 | Kimata et al. |
| 6,316,770 B1 * | 11/2001 | Ouvrier-Buffet et al. . 250/338.1 |
| 2009/0072287 A1 | 3/2009 | Noda |
| 2009/0127604 A1 | 5/2009 | Noda |

FOREIGN PATENT DOCUMENTS

| JP | 3574368 B2 | 7/2004 |
| JP | 2008-232896 A | 10/2008 |
| JP | 2009-071242 A | 4/2009 |
| JP | 2009-129972 A | 6/2009 |

* cited by examiner

Primary Examiner — David Porta
Assistant Examiner — Hugh H Maupin
(74) Attorney, Agent, or Firm — Global IP Counselors, LLP

(57) ABSTRACT

A thermal detector has a thermal detection element in which a physical characteristic changes based on temperature, a light-absorbing member configured and arranged to collect heat and transmit collected heat to the thermal detection element, a support member mounting the thermal detection element on a first side with a second surface facing a cavity, and a support part supporting a portion of the support member. The light-absorbing member is a plate shaped member at least partially contacting a top part of the thermal detection element and having a portion overhanging to an outside from the top part of the thermal detection element in plan view.

20 Claims, 11 Drawing Sheets

THERMAL DETECTOR, THERMAL DETECTION DEVICE, AND ELECTRONIC INSTRUMENT

CROSS-REFERENCE TO RELATED APPLICATIONS

This application claims priority to Japanese Patent Application No. 2010-167516 filed on Jul. 26, 2010. The entire disclosure of Japanese Patent Application No. 2010-167516 is hereby incorporated herein by reference.

BACKGROUND

1. Technical Field

The present invention relates to a thermal detector, a thermal detection device, and an electronic instrument or the like.

2. Related Art

Known infrared detection devices include pyroelectric or bolometer-type infrared detection devices. An infrared detection device utilizes a change (pyroelectric effect or pyroelectronic effect) in the amount of spontaneous polarization of a pyroelectric material according to the light intensity (temperature) of received infrared rays to create an electromotive force (charge due to polarization) at both ends of the pyroelectric body (pyroelectric-type) or vary a resistance value according to the temperature (bolometer-type) and detect the infrared rays. Compared with a bolometer-type infrared detection device, a pyroelectric infrared detection device is complex to manufacture, but has the advantage of excellent detection sensitivity.

A cell of a pyroelectric infrared detection device has a capacitor which includes a pyroelectric body connected to an upper electrode and a lower electrode, and various proposals have been made regarding the material of the electrodes or the pyroelectric body (Japanese Laid-Open Patent Application Publication No. 2008-232896).

A capacitor which includes a ferroelectric body connected to an upper electrode and a lower electrode is used in ferroelectric memory, and various proposals have been made regarding the material of the electrodes or the ferroelectric body to be suitable for ferroelectric memory (Japanese Laid-Open Patent Application Publication No. 2009-71242 and Japanese Laid-Open Patent Application Publication No. 2009-129972). A structure for absorbing infrared rays is disclosed in Japanese Patent No. 3574368 as a bolometer-type infrared detector.

SUMMARY

In pyroelectric as well as in bolometer-type infrared detection devices, efficient transmission of heat to the detection element, the heat being obtained by efficient absorption of the incident infrared rays, leads to enhanced precision of measurement. In FIGS. 21 and 22 of Japanese Patent No. 3574368 disclosing a bolometer-type infrared detection device, an optical resonance structure is shown in which a reflecting layer is disposed via a cavity on a back surface side of a detection part which includes a bolometer thin layer, and the distance between the detection part and the reflecting layer is λ/4 (where λ is the incident wavelength). In FIG. 1 and other drawings in Japanese Patent No. 3574368, a flat plate-shaped infrared-absorbing part is provided further toward the infrared incidence side than the detection part, and the detection part and the infrared-absorbing part are linked by a junction column.

When the technique of Japanese Patent No. 3574368 is applied to a pyroelectric infrared detector, since the pyroelectric detection element has a capacitor structure in which a pyroelectric material is held between two electrodes, almost no infrared rays reach the reflecting layer on the back of the capacitor, and the infrared rays are instead reflected by the electrodes in the capacitor.

When the detection part and the infrared-absorbing part are linked by a junction column, the vertically standing junction column contributes almost no absorption of infrared rays, and because of the small transverse sectional area of the junction column, which is the only heat transfer path between the infrared-absorbing part and the detection part, the heat transfer properties thereof are poor, and heat transfer loss occurs.

An object of the several aspects of the present invention is to provide a thermal detector whereby efficiently collected heat is efficiently transmitted to a thermal detection element, and detection sensitivity can be enhanced, and to provide a thermal detection device and an electronic instrument.

A thermal detector according to one aspect of the present invention includes a thermal detection element, a light-absorbing member, a support member and a support part. The thermal detection element changes physical characteristics according to temperature. The light-absorbing member is configured and arranged to collect heat and to transmit collected heat to the thermal detection element, the light-absorbing member being a plate shaped member at least partially contacting a top part of the thermal detection element and having a portion overhanging to an outside from the top part of the thermal detection element in plan view. The support member includes a first side and a second side opposite from the first side with the thermal detection element being mounted on the first side and the second side facing a cavity. The support part supports a portion of the second side of the support member.

According to this aspect of the present invention, the light-absorbing member formed in a plate shape so as to overhang to the outside from the top part of the thermal detection element on a top side (upstream side in the light incidence direction in the case of light detection) of the thermal detection element is linked to the top part of the thermal detection element, and heat which is efficiently collected by conversion of light to heat by the light-absorbing member can therefore be transferred from the light-absorbing member to the thermal detection element. Heat transfer loss is therefore minimal, and detection sensitivity is increased by increasing the strength of the signal obtained by a change in a physical characteristic based on temperature. Since the light-absorbing member is also supported by the top part of the thermal detection element, there is no need for the junction column of Japanese Patent No. 3574368, and not only is support stabilized, but the surface area for heat transfer is also increased.

In the thermal detector as described above, the thermal detection element is preferably a pyroelectric detection element including a capacitor that changes an amount of polarization according to temperature, the capacitor including a first electrode, a second electrode, and a pyroelectric body disposed between the first electrode and the second electrode. In this case, the light-absorbing member may have a surface area greater than the surface area of the capacitor of the pyroelectric detection element in plan view.

In the thermal detector as described above, the pyroelectric detection element preferably further includes a protective layer protecting an outer surface of the capacitor with the protective layer forming a contact hole passing through to the second electrode, a plug filling the contact hole and having both electrical conduction properties and heat transfer properties, and a wiring layer formed in a prescribed pattern on the protective layer and the plug, and the light-absorbing member is preferably linked to the second electrode via the plug and the wiring layer.

According to the aspect described above, since the light-absorbing member is linked to the second electrode of the capacitor via a plug having heat transfer properties, the heat collected by absorption of light can be efficiently transferred to the capacitor from the light-absorbing member via the plug having heat transfer properties. The signal strength can thus be increased, and the detection sensitivity can be enhanced.

In the thermal detector as described above, the plug is preferably in contact with a region of the second electrode constituting 50% or more of a surface area of the second electrode in plan view.

In general, when the plug is used only as an electrical contact between the wiring layer and the second electrode, the contact hole is formed with a relatively small diameter. However, in this aspect of the present invention, the plug has electrical conduction properties and heat transfer properties. In order to ensure the heat transfer properties of the plug, the plug is in contact with a region of the second electrode constituting 50% or more, preferably 60%, and more preferably 80% or more of the surface area of the second electrode in plan view. The electrical conduction properties and the heat transfer properties of the plug are thereby ensured.

In the thermal detector as described above, the light-absorbing member preferably includes a plate-shaped support layer covering the top part of the thermal detection element and overhanging to the outside from the top part of the thermal detection element in plan view, and a heat collection layer formed on the support layer.

According to the aspect described above, in the two-layer light-absorbing member composed of the support layer and the heat collection layer, the heat collection layer having an undercut shape and a relatively large surface area can be supported by the support layer, and damage to the light-absorbing member can be reduced. In the two-layer light-absorbing member composed of the support layer and the heat collection layer, the heat in the heat collection layer having a relatively large surface area can be efficiently transferred to the thermal detection element by the support layer, which has higher heat transfer properties than the heat collection layer, and the detection sensitivity can be increased.

In the thermal detector as described above, the thermal detection element is preferably a pyroelectric detection element including a capacitor that changes an amount of polarization according to temperature, the capacitor including a first electrode, a second electrode, and a pyroelectric body disposed between the first electrode and the second electrode. The light-absorbing member preferably includes a plate-shaped support layer covering a top part of the second electrode and overhanging to an outside from the top part of the second electrode with the support layer having a surface area greater than a surface area of the capacitor in plan view, and a heat collection layer formed on the support layer.

In the thermal detector as described above, the support layer is preferably made of electrically conductive material, and the pyroelectric detection element preferably includes a protective layer covering a side surface of the capacitor, and a wiring layer formed in a prescribed pattern on the protective layer, the wiring layer being electrically connected to the second electrode via the support layer.

The electrical connection between the second electrode and the wiring layer can thus be established via the support layer, and there is no need for the plug described above. Heat can therefore be conducted directly from the light-absorbing member to the second electrode, and heat transfer efficiency is enhanced.

In the thermal detector as described above, the pyroelectric detection element preferably further includes a first reducing gas barrier layer disposed between the protective layer and an outer surface of the capacitor, and a second reducing gas barrier layer covering the protective layer and the wiring layer.

According to the aspect described above, the first reducing gas barrier layer can protect the capacitor from reducing gas during the process of forming the protective layer, and the first and second reducing gas barrier layers can act as a double barrier layer to protect the capacitor from reducing gas during actual use. The second reducing gas barrier layer can also serve as an etching stop layer for protecting the pyroelectric detection element from the etchant during etching to remove the sacrificial layer after manufacturing of the light-absorbing member, the sacrificial layer being necessary in the process of manufacturing the light-absorbing member.

In the thermal detector as described above, the pyroelectric detection element preferably further includes a protective layer covering a side surface of the capacitor and a portion of a top part of the capacitor with the protective layer forming a contact hole in a position corresponding to the top part of the capacitor, a plug filling the contact hole and having electrical conduction properties, and a wiring layer formed in a prescribed pattern on the protective layer and the plug, and the light-absorbing member covers, in plan view, the capacitor in a region other than a wiring contact region in which the plug and the wiring layer covering the plug are disposed.

According to the aspect described above, not only can the light-absorbing member be linked to the second electrode without the intervention of a plug, but the wiring to the second electrode can also be connected to the wiring layer via the plug filled into the contact hole. The reliability of the wiring can therefore also be ensured.

A thermal detection device according to another aspect of the present invention includes a plurality of the thermal detectors as described above, arranged in two dimensions along two intersecting axes. In this thermal detection device, the detection sensitivity is increased in the thermal detector of each cell, and a distinct light (temperature) distribution image can therefore be provided.

An electronic instrument according to another aspect of the present invention has the thermal detector or the thermal detection device described above, and by using one or a plurality of cells of the thermal detector as a sensor, the electronic instrument is most suitable in thermography for outputting a light (temperature) distribution image, in night vision and surveillance cameras as well as object analysis instruments (measurement instruments) for analyzing (measuring) physical information of objects, in security instruments for detecting fire or heat, in factory automation (FA) instruments provided in factories or the like, and in other applications.

BRIEF DESCRIPTION OF THE DRAWINGS

Referring now to the attached drawings which form a part of this original disclosure.

DETAILED DESCRIPTION OF EXEMPLARY EMBODIMENTS

Preferred embodiments of the present invention will be described in detail. The embodiments described below do not unduly limit the scope of the present invention as recited in the claims, and all of the configurations described in the embodiments are not necessarily essential means of achievement of the present invention.

1. First Embodiment 1.1 Pyroelectric Infrared Detection Device

Figure 1:
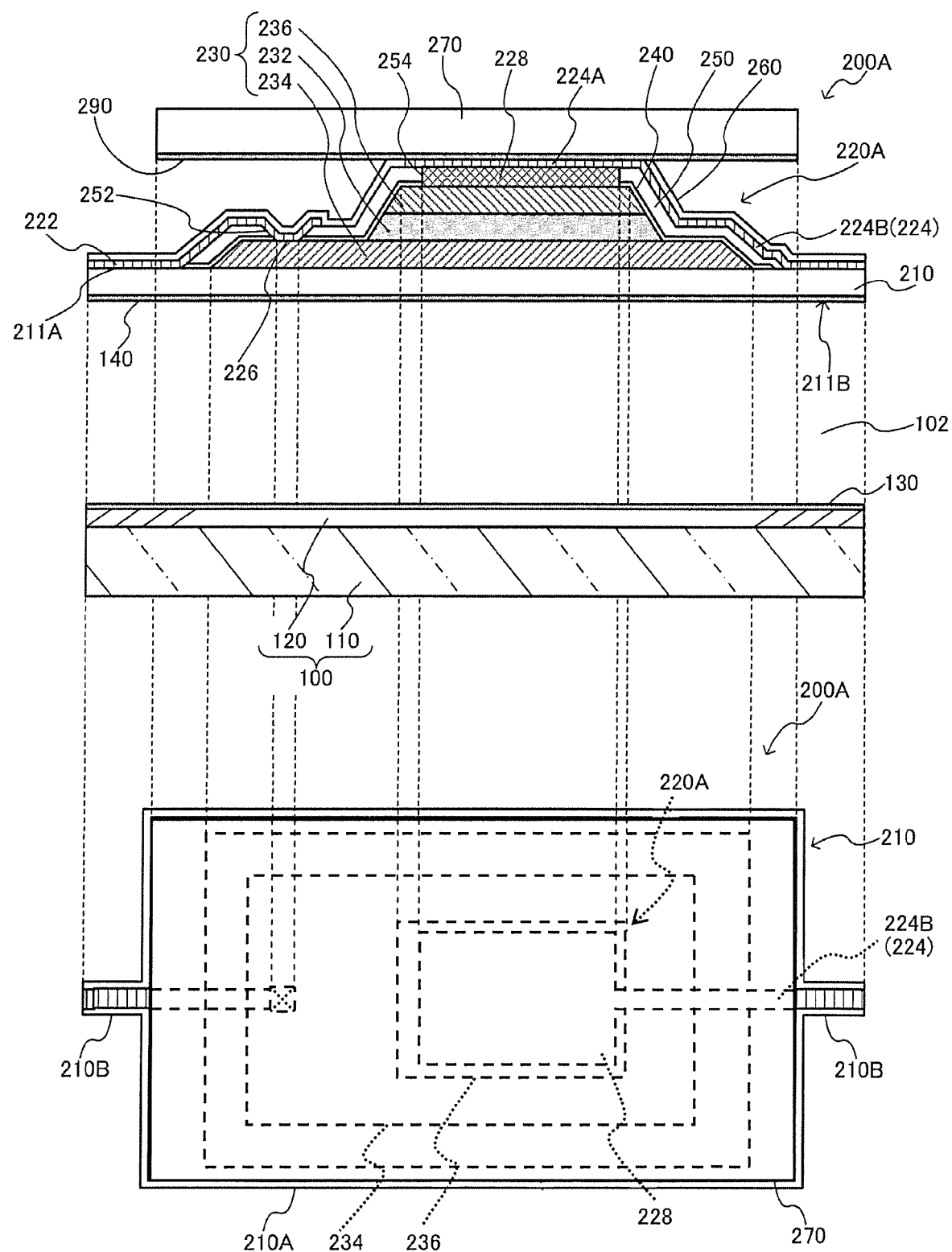
FIG. 1 is a simplified sectional view and simplified plan view showing the pyroelectric detector of one cell of the pyroelectric infrared detection device according to a first embodiment of the present invention.
Figure 2:
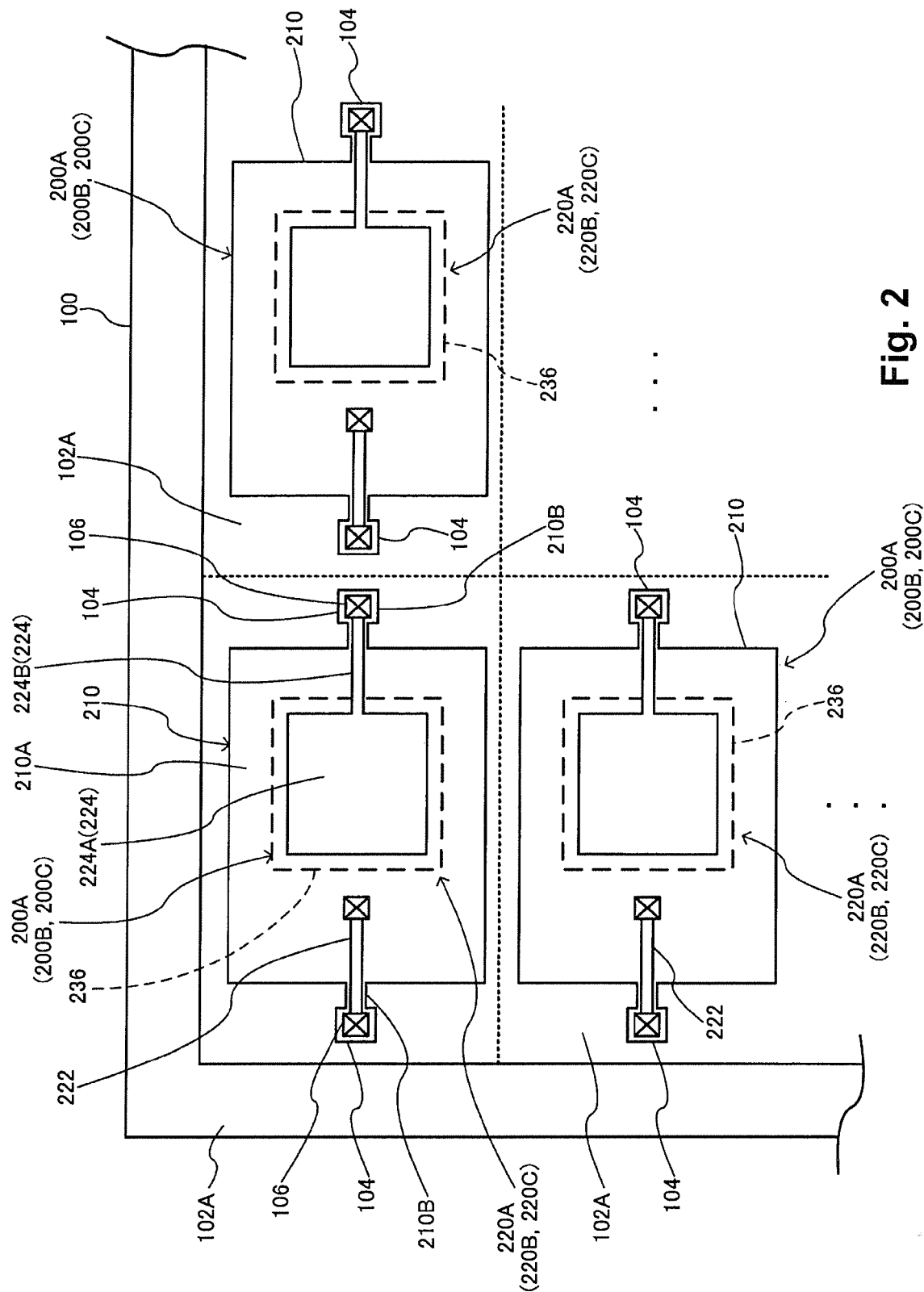
FIG. 2 is a simplified plan view showing the pyroelectric infrared detection device according to an embodiment of the present invention.

FIG. 2 shows a pyroelectric infrared detection device (one example of a pyroelectric optical detection device) in which a plurality of cells of pyroelectric infrared detectors (one example of thermal detectors) 200A is arranged along two directions, e.g., two orthogonal axes, each cell being provided with a support member 210 and a pyroelectric infrared detection element (one example of a thermal detection element) 220A mounted on the support member 210 shown in FIG. 1. A pyroelectric infrared detection device may also be formed by a pyroelectric infrared detector of a single cell. In FIG. 2, a plurality of posts 104 is provided upright from a base part (also referred to as a fixed part) 100, and pyroelectric infrared detectors 200A, each cell of which is supported by two posts (support parts) 104, for example, are arranged along two orthogonal axes. The region occupied by each cell of pyroelectric infrared detectors 200A is a rectangle having a side length of several tens of microns, for example.

As shown in FIG. 2, each pyroelectric infrared detector 200A includes the support member (membrane) 210 linked to two posts (support parts) 104, and the pyroelectric infrared detection element 220A. The region occupied by the pyroelectric infrared detection element 220A of one cell is a rectangle having a side length of about 10 μm, for example.

Besides being connected to the two posts 104, the pyroelectric infrared detector 200A of each cell is in a non-contacting state, a cavity 102 (see FIG. 1) is formed below the pyroelectric infrared detector 200A, and open parts 102A communicated with the cavity 102 are provided on the periphery of the pyroelectric infrared detector 200A in plan view. The pyroelectric infrared detector 200A of each cell is thereby thermally separated from the base part 100 as well as from the pyroelectric infrared detectors 200A of other cells.

The support member 210 has a mounting part 210A for mounting and supporting the pyroelectric infrared detection element 220A, and two arms 210B linked to the mounting part 210A, and free end parts of the two arms 210B are linked to the posts 104. The two arms 210B are shown in simplified fashion in FIG. 2, but may be formed so as to extend redundantly and with a narrow width in order to thermally separate the infrared detection element 220A.

FIG. 2 is a plan view which omits the members above the wiring layers connected to the upper electrodes for the sake of brevity, and FIG. 2 shows a first electrode (lower electrode) wiring layer 222 and a second electrode (upper electrode) wiring layer 224 connected to the infrared detection element 220A. The second electrode wiring layer 224 includes a wiring layer 224A formed on the second electrode (upper electrode) 236, and a wiring layer 224B which is connected to the wiring layer 224A. The first and second electrode wiring layers 222, 224 extend along the arms 210B from the mounting part 210A, and are connected to a circuit inside the base part 100 via the posts 104. The first and second electrode wiring layers 222, 224 are also formed so as to extend redundantly and with a narrow width in order to thermally separate the infrared detection element 220A.

1.2. Pyroelectric Infrared Detector

FIG. 1 is a sectional view (top portion of FIG. 1) and a plan view (bottom portion of FIG. 1) showing the pyroelectric infrared detector 200A shown in FIG. 2. In the pyroelectric infrared detector 200A during the manufacturing process, the cavity 102 shown in FIG. 1 is embedded by a first sacrificial layer 150 (see FIG. 3A). The sacrificial layer 150 is present from before the step of forming the support member 210 and the pyroelectric infrared detection element 220A until after this formation step, and is removed by isotropic etching after the step of forming the pyroelectric infrared detection element 220A.

As shown in FIG. 1, the base part 100 includes a substrate, e.g., a silicon substrate 110, and a spacer layer 120 formed by an insulation layer (e.g., $SiO_2$) on the silicon substrate 110. The post (support part) 104 shown in FIG. 2 is formed by etching the spacer layer 120, and is formed of $SiO_2$, for example. A plug 106 (see FIG. 2) connected to the first and second electrode wiring layers 222, 224 may be disposed at the post (support part) 104. The plug 106 is connected to a row selection circuit (row driver) provided to the silicon substrate 110, or a read circuit for reading data from a detector via a column line. The cavity 102 is formed at the same time as the post 104 by isotropically etching the first sacrificial layer 150 (see FIG. 4B and other drawings) in the spacer layer 120. The open parts 102A shown in FIG. 2 are formed by pattern etching the support member 210. An etchant is fed from the open parts 102A shown in FIG. 2 to isotropically etch the first sacrificial layer 150 (see FIG. 4B and other drawings). Etching stop layers 130, 140 are left on the exposed surface of the cavity 102 as shown in FIG. 1 for this etching.

The infrared detection element 220A mounted on a first surface 211A on a first side of the support member 210 includes a capacitor 230. The capacitor 230 includes a pyroelectric body 232, a first electrode (lower electrode) 234 connected to the lower surface of the pyroelectric body 232, and a second electrode (upper electrode) 236 connected to the upper surface of the pyroelectric body 232. The first electrode 234 may include an adhesive layer for increasing adhesion to a first layer member (e.g., $SiO_2$ as an insulation layer) of the support member 210 formed by a plurality of layers, for example. A second surface 211B on a second side of the support member 210 faces the cavity 102.

The capacitor 230 is covered by a first reducing gas barrier layer 240 for suppressing penetration of reducing gas (hydrogen, water vapor, OH groups, methyl groups, and the like) into the capacitor 230 during steps after formation of the capacitor 230. The reason for this is that the pyroelectric body (e.g., PZT or the like) 232 of the capacitor 230 is an oxide, and when an oxide is reduced, oxygen deficit occurs and the pyroelectric effects are compromised.

The reducing gas barrier layer 240 includes a first barrier layer adjacent to the capacitor 230, and a second barrier layer which is laminated on the first barrier layer. The first barrier layer can be formed by forming a layer of aluminum oxide $Al_2O_3$, for example, by sputtering. Since reducing gas is not used in sputtering, no reduction of the capacitor 230 occurs. The second hydrogen barrier layer can be formed by forming a layer of aluminum oxide $Al_2O_3$, for example, by atomic layer chemical vapor deposition (ALCVD), for example. Common chemical vapor deposition (CVD) methods use reducing gas, but the capacitor 230 is isolated from the reducing gas by the first layer barrier layer.

The total layer thickness of the first reducing gas barrier layer 240 herein is 50 to 70 nm, e.g., 60 nm. At this time, the layer thickness of the first barrier layer formed by CVD is greater than that of the second barrier layer formed by atomic layer chemical vapor deposition (ALCVD), and is 35 to 65 nm, e.g., 40 nm, at minimum. In contrast, the layer thickness of the second barrier layer formed by atomic layer chemical vapor deposition (ALCVD) can be reduced; for example, a layer of aluminum oxide $Al_2O_3$ is formed having a thickness of 5 to 30 nm, e.g., 20 nm. Atomic layer chemical vapor deposition (ALCVD) has embedding characteristics that are superior to those of sputtering and other methods, and can therefore be adapted for miniaturization, and the reducing gas barrier properties in the first and second barrier layers can be enhanced. The first barrier layer formed by sputtering is not finer than the second barrier layer, but this aspect contributes to lowering the heat transfer rate thereof, and dissipation of heat from the capacitor 230 can therefore be prevented.

An interlayer insulation layer 250 is formed on the first reducing gas barrier layer 240. Hydrogen gas, water vapor, or other reducing gas usually is formed when the starting material gas (TEOS) of the interlayer insulation layer 250 chemically reacts. The first reducing gas barrier layer 240 provided on the periphery of the capacitor 230 protects the capacitor 230 from the reducing gas that occurs during formation of the interlayer insulation layer 250. The first reducing gas barrier layer 240 and the interlayer insulation layer 250 can be referred to as protective layers for protecting the capacitor 230. Alternatively, in a case in which the interlayer insulation layer 250 is referred to as a protective layer for protecting the capacitor 230, the first reducing gas barrier layer 240 may be disposed in between the protective layer 250 and the capacitor 230.

The first electrode (lower electrode) wiring layer 222 and second electrode (upper electrode) wiring layer 224 shown in FIG. 2 as well are disposed on the interlayer insulation layer 250. A first contact hole 252 and second contact hole 254 are formed in advance in the interlayer insulation layer 250 before formation of the electrode wiring. At this time, a contact hole is formed in the same manner in the first reducing gas barrier layer 240 as well. The first electrode (lower electrode) 234 and the first electrode wiring layer 222 are made continuous by a first plug 226 embedded in the first contact hole 252. The second electrode (upper electrode) 236 and the second electrode wiring layer 224 are made continuous in the same manner by a second plug 228 embedded in the second contact hole 254.

When the interlayer insulation layer 250 is not present in this arrangement, during pattern etching of the first electrode (lower electrode) wiring layer 222 and the second electrode (upper electrode) wiring layer 224, the second barrier layer of the first reducing gas barrier layer 240 beneath is etched, and the barrier properties thereof are reduced. The interlayer insulation layer 250 is necessary in order to secure the barrier properties of the first reducing gas barrier layer 240.

The interlayer insulation layer 250 preferably has a low hydrogen content. The interlayer insulation layer 250 is therefore degassed by annealing.

Since the first reducing gas barrier layer 240 at the top of the capacitor 230 is devoid of the second contact hole 254 and closed when the interlayer insulation layer 250 is formed, the reducing gas during formation of the interlayer insulation layer 250 does not penetrate into the capacitor 230. However, the barrier properties decline after the second contact hole 254 is formed in the first reducing gas barrier layer 240. As an example of a technique for preventing this phenomenon, the second plug 228 may include a barrier metal layer. Highly diffusible metals such as titanium Ti are not preferred as the barrier metal layer, and titanium aluminum nitride TiAlN, which has minimal diffusibility and high reducing gas barrier properties, can be used.

A second reducing gas barrier layer 260 may be provided so as to cover the interlayer insulation layer 250 and the first and second electrode wiring layers 222, 224. In the plan view of FIG. 1, the second reducing gas barrier layer 260 is omitted for the sake of brevity. The second reducing gas barrier layer 260 also functions as an etching stop layer during isotropic etching of a second sacrificial layer 280 (see FIG. 4B and other drawings) which is embedded beneath an infrared-absorbing layer 270 having an undercut shape, in the process of manufacturing the infrared-absorbing layer 270. The second reducing gas barrier layer 260 is formed by forming a layer of aluminum oxide $Al_2O_3$, for example, at a thickness of 20 to 50 nm by atomic layer chemical vapor deposition (ALCVD).

Figure 4A:
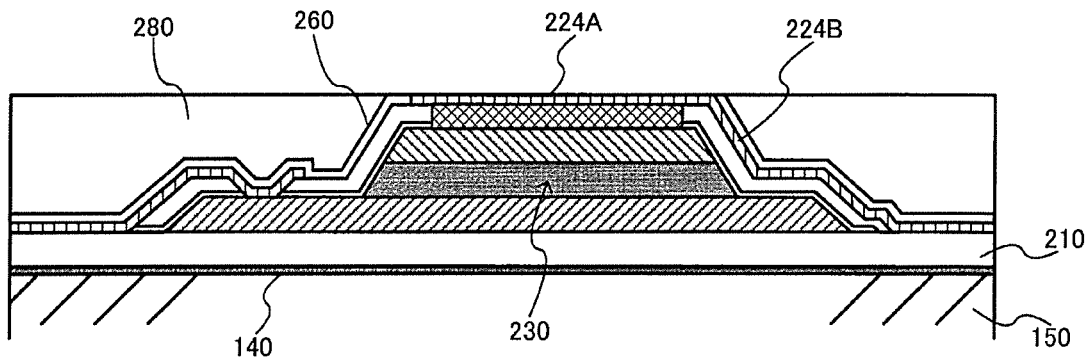
FIGS. 4A through 4C are simplified sectional views showing the second half of the steps for manufacturing the infrared detector shown in FIG. 1.
Figure 4B:
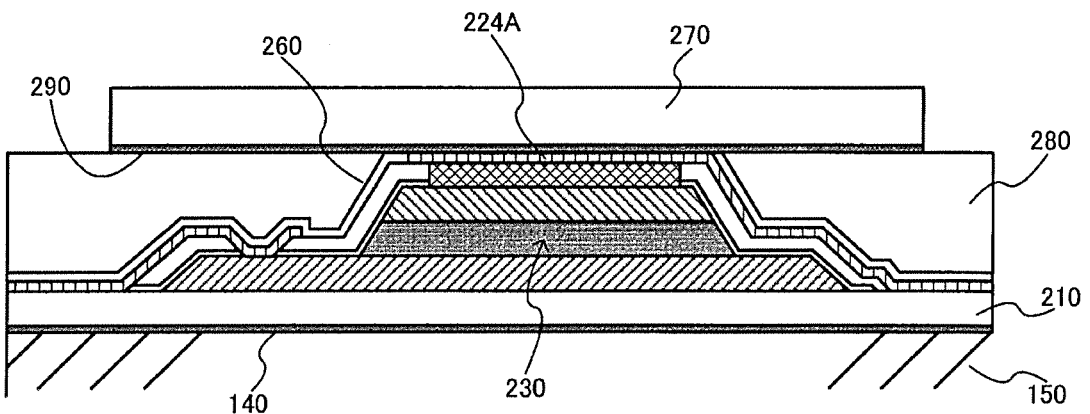

The second reducing gas barrier layer 260, together with the first reducing gas barrier layer 240, can suppress penetration of reducing gas into the capacitor 230 when the second sacrificial layer 280 shown in FIG. 4B and other drawings is isotropically etched in a reductive atmosphere by hydrofluoric acid or the like.

The infrared-absorbing body (one example of a light-absorbing member) 270 is disposed further upstream in the infrared incidence direction than the pyroelectric detection element 220A. The infrared-absorbing body 270 is formed of a material which evolves heat in accordance with the amount of infrared rays absorbed, and is formed by $SiO_2$ or SiN, for example. The heat collected by absorption of infrared rays is transferred to the pyroelectric body 232 from the infrared-absorbing body 270, whereby the amount of spontaneous polarization of the capacitor 230 varies according to the heat, and the infrared rays can be detected by detecting the charge due to the spontaneous polarization.

The infrared-absorbing body 270 is linked to the second electrode (upper electrode) 236 positioned at the top part of the infrared detection element 220A, is formed in a plate shape so as to cover the top part of the infrared detection element 220A and overhang to the outside from the top part of the infrared detection element 220A, and has a surface area greater than the surface area (surface area of the first electrode 234 having the maximum surface area in the present embodiment) of the capacitor 230 in plan view (see the plan view of FIG. 1). The surface area of the infrared-absorbing body 270 is set so as to be essentially equal in each cell in a range not exceeding the surface area occupied by a single cell when the pyroelectric infrared detectors 200A of each cell are arranged in two dimensions along two orthogonal axes as shown in FIG. 2.

In the present embodiment, the infrared-absorbing body 270 is linked to the second electrode (upper electrode) 236 via the second plug 228 and the wiring layer 224A (see the sectional view of FIG. 1). In FIG. 1, an etching stop layer (e.g., aluminum oxide $Al_2O_3$ layer) 290 which is necessary during isotropic etching of the second sacrificial layer 280 (see FIG. 4B and other drawings) described hereinafter remains on the lower surface of the infrared-absorbing body 270. In this case, the etching stop layer 290 is also present between the infrared-absorbing body 270 and the wiring layer 224A. However, the etching stop layer 290 is not needed when the material of the infrared-absorbing body 270 has a high selection ratio with respect to the etchant for etching the second sacrificial layer 280.

In general, when the second plug 228 is used only for electrical contact between the wiring layer 224 and the second electrode, the second contact hole 254 is formed with a relatively small diameter. However, in the present embodiment, it is of utmost importance that the second plug 228 has electrical conduction properties and heat transfer properties. The second plug 228 therefore must have heat transfer properties. The plug is therefore in contact with a region of the second electrode 236 constituting 50% or more, preferably 60%, and more preferably 80% or more of the surface area of the second electrode 236 in plan view. The electrical conduction properties and the heat transfer properties of the second plug 228 are thereby ensured.

Through the infrared detector 200A of the present embodiment, the infrared-absorbing body 270 having a surface area greater than the surface area of the capacitor 230 in plan view is provided further upstream in the infrared incidence direction than the pyroelectric infrared detection element 220A, and incident infrared rays can therefore be efficiently converted to heat by the pyroelectric infrared detector 200A of each cell. Since the infrared-absorbing body 270 is also supported by the top part of the pyroelectric infrared detection element 220A, there is no need for the junction column of Japanese Patent No. 3574368, and not only is support stabilized, but the surface area for heat transfer is also increased.

Since the infrared-absorbing body 270 is linked to the second electrode (upper electrode) 236 of the capacitor 230 via the second plug 228 which has heat transfer properties, the heat collected by absorption of infrared rays can be efficiently transferred from the infrared-absorbing body 270 to the capacitor 230 via the second plug 228 which has heat transfer properties. The signal strength based on infrared detection can thus be increased, and the infrared detection sensitivity can be enhanced.

The thickness of the infrared-absorbing body 270 can be set to $(2m+1)\lambda/4$ (where $m=0, 1, 2, \ldots$) with respect to the wavelength $\lambda$ of the incident infrared rays. The infrared rays not absorbed by the infrared-absorbing body 270 thereby resonate in an optical resonance structure in which the wiring layer 224A is a lower reflecting layer, and the uppermost surface (interface) of the infrared-absorbing body 270 is an upper reflecting layer. The efficiency of infrared absorption by the infrared-absorbing body 270 can thereby be increased.

1.3 Method for Manufacturing Infrared Detector

Figure 3A:
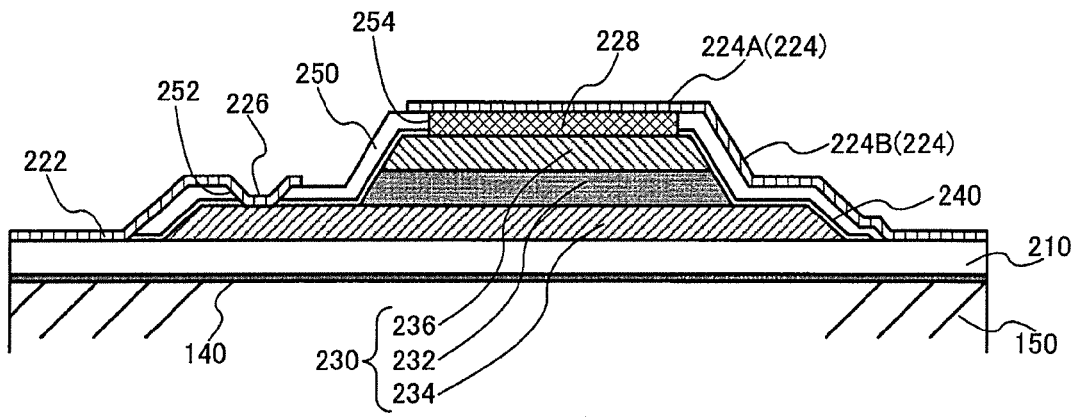
FIGS. 3A through 3C are simplified sectional views showing the first half of the steps for manufacturing the infrared detector shown in FIG. 1.

A method for manufacturing the infrared detector 200A shown in FIG. 1 will next be described with reference to FIGS. 3A through 3C and FIGS. 4A through 4C. As shown in FIG. 3A, the first sacrificial layer 150 is embedded in the region forming the cavity 102 in the finished product shown in FIG. 1, and the etching stop layer 140 is formed on the first sacrificial layer 150. The support member 210 and the infrared detection element 220A are formed on the first sacrificial layer 150 and the etching stop layer 140 thereon. In this state, the support member 210 is not patterned, and is formed on the entire surface.

FIG. 3A shows a state in which the support member 210, the capacitor 230, the first reducing gas barrier layer 240, the interlayer insulation layer 250, the first and second contact holes 252, 254, the first and second plugs 226, 228, and the wiring layers 222, 224 are formed on the etching stop layer 140.

Figure 3B:
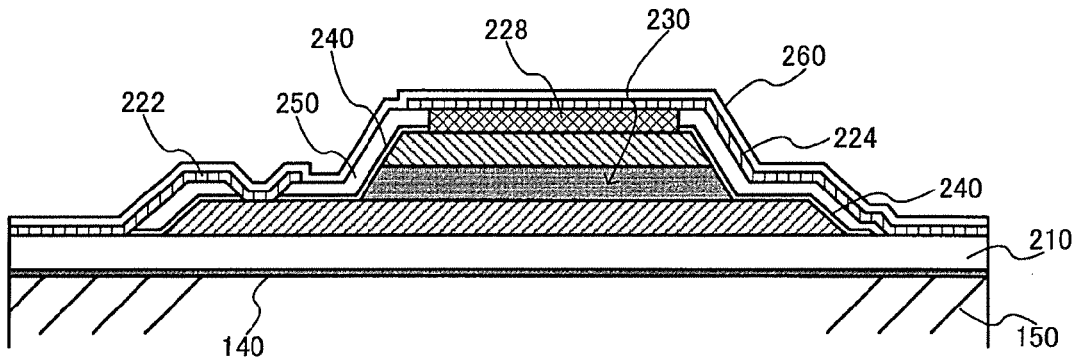
Figure 3C:
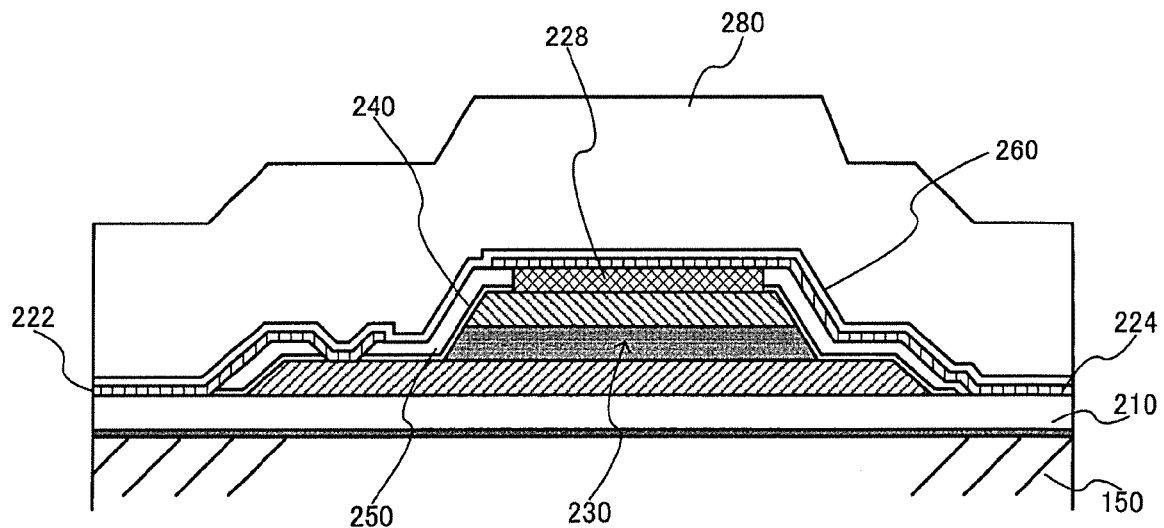

As shown in FIG. 3B, the second reducing gas barrier layer 260 for functioning also as an etching stop layer (e.g., aluminum oxide $Al_2O_3$ layer) is then formed by atomic layer chemical vapor deposition (ALCVD), for example, so as to cover the entire exposed surface of the support member 210 in the state shown in FIG. 3A. As shown in FIG. 3C, the second sacrificial layer (e.g., $SiO_2$) 280 is formed by CVD or the like, for example, so as to cover the entire surface of the second reducing gas barrier layer 260. At this time, the second sacrificial layer 280 is formed so as to conform to the irregularities of the underlying layer.

As shown in FIG. 4A, the second sacrificial layer 280 is then planarized by CMP, for example, or another method, and the second sacrificial layer 280 is made flush with the wiring layer 224A of the top part. A flat surface for forming the infrared-absorbing body 270 is thereby formed. In FIG. 4A, a portion of the second reducing gas barrier layer 260 on the second plug 228 and the wiring layer 224A is also etched, and the wiring layer 224A is exposed on the top surface.

As shown in FIG. 4B, the etching stop layer (e.g., aluminum oxide $Al_2O_3$ layer) 290 is then formed on the entire surface by Atomic layer chemical vapor deposition (AL-CVD), for example, and the infrared-absorbing body (e.g., $SiO_2$ layer or SiN layer) 270 is formed thereon by CVD or another method. The etching stop layer 290 and the infrared-absorbing body 270 are then patterned by photolithography. An infrared-absorbing body 270 having a surface area greater than the surface area of the capacitor 230 in plan view is thereby formed by patterning in each cell.

Figure 4C:
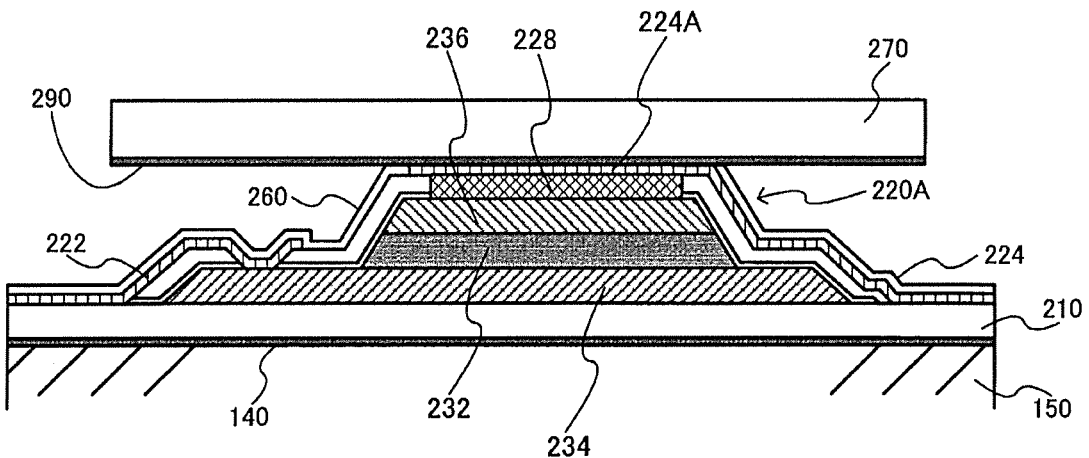

As shown in FIG. 4C, the second sacrificial layer 280 is then removed by isotropic etching using hydrofluoric acid, for example. At this time, the infrared-absorbing body 270 is protected by the etching stop layer 290, and the infrared detection element 220A is also protected by the etching stop layer (second reducing gas barrier layer) 260. An etching stop layer is also preferably formed in advance on the side surfaces of the infrared-absorbing body 270. The portion of the lower surface of the infrared-absorbing body 270 not adjacent to the top part of the infrared detection element 220A thereby becomes a non-contacting surface having an undercut shape, and is thermally separated. Since the infrared-absorbing body 270 has a non-contacting surface in the portion not adjacent to the top part of the infrared detection element 220A, the collected heat is transferred to the capacitor 230 by solid heat conduction.

The support member 210 is subsequently patterned, and by using the open part 102A (see FIG. 2) thereby formed, the first sacrificial layer 150 beneath the support member 210 is removed by isotropic etching by hydrofluoric acid or the like, and the infrared detector 200A shown in FIG. 1 is thereby completed.

2. Second Embodiment

2.1 Structure of Infrared-Absorbing Body

Figure 5:
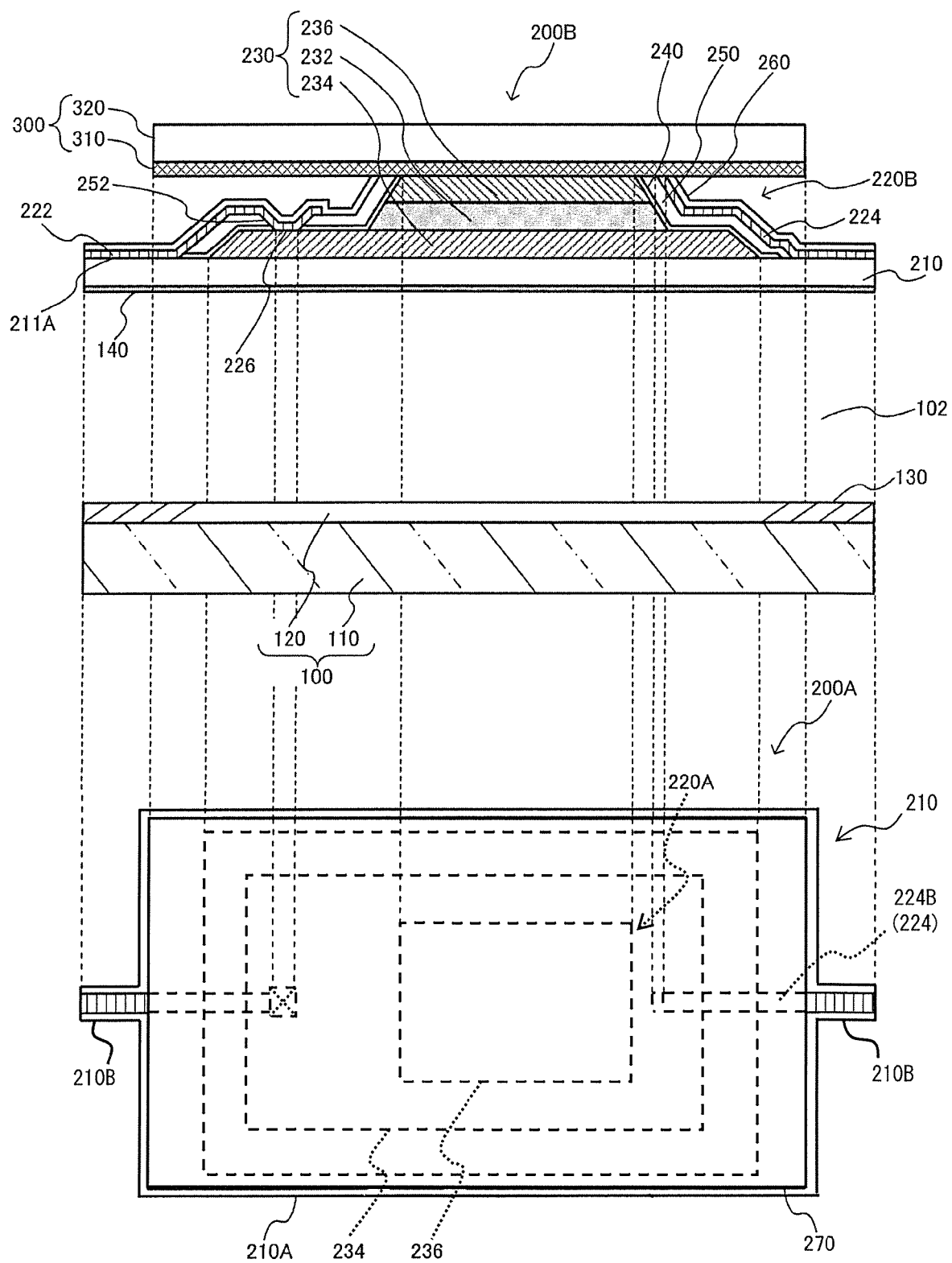
FIG. 5 is a simplified sectional view and simplified plan view showing the pyroelectric detector of one cell of the pyroelectric infrared detection device according to a second embodiment of the present invention.

FIG. 5 shows the infrared detector 200B according to a second embodiment. Members shown in FIG. 5 that have the same functions as members in FIG. 1 are referred to by the same reference symbols as in FIG. 1, and no detailed description thereof will be given.

The infrared detector 200B shown in FIG. 5 differs from the infrared detector 200A shown in FIG. 1 with respect to the infrared-absorbing body (one example of a light-absorbing member) 300 and the linking structure thereof. The infrared-absorbing body 300 is formed in a plate shape so as to cover the top part of the second electrode 236 and overhang to the outside from the top part of the second electrode 236, and has a support layer 310 which has a surface area greater than the surface area of the capacitor 230 in plan view, and an infrared-absorbing layer 320 which is formed on the support layer 310.

The infrared detection element 220B shown in FIG. 5 may also have the first reducing gas barrier layer 240, interlayer insulation layer 250, and second reducing gas barrier layer 260 on the periphery of the capacitor 230, the same as in the infrared detection element 220A shown in FIG. 1, although, in the plan view of FIG. 5, the second reducing gas barrier layer 260 is omitted for the sake of brevity. However, there is no need for the second contact hole 254 or the second plug 228 shown in FIG. 1 in the infrared detection element 220B shown in FIG. 5. Instead, the uppermost parts of the first reducing gas barrier layer 240, the interlayer insulation layer 250, and the second reducing gas barrier layer 260 are planarized, and the second electrode 236 is in contact with the support layer 310. The support layer 310 may have the etching stop layer 290 described above as the bottom layer thereof.

The support layer 310 is made of electrically conductive material. Also, the support layer 310 may have the function (rigidity) of supporting and reinforcing the infrared-absorbing layer 320, and may have other functions such as heat transfer, and infrared reflection. A metal is therefore preferably used for the support layer 310.

In the two-layer infrared-absorbing body 300 composed of the support layer 310 and the infrared-absorbing layer 320, the infrared-absorbing layer 320 having a relatively large surface area and an undercut shape can be supported by the support layer 310, and damage to the infrared-absorbing body 300 can be reduced. In the two-layer infrared-absorbing body 300 composed of the support layer 310 and the infrared-absorbing layer 320, the heat in the infrared-absorbing layer 320 having a relatively large surface area can be efficiently transferred to the second electrode 236 by the support layer 310, and the detection sensitivity can be increased.

In particular, in the present embodiment, the electrical connection between the second electrode 236 and the wiring layer 224 can be made via the support layer 310, and there is no need for the second plug 228 shown in FIG. 1. Heat can therefore be conducted directly from the infrared-absorbing body 300 to the second electrode 236, and heat transfer efficiency is enhanced.

In the present embodiment, the thickness of the infrared-absorbing layer 320 can be set to $(2m+1)\lambda/4$ (where m=0, 1, 2, . . . ) with respect to the wavelength $\lambda$ of the incident infrared rays. The infrared rays not absorbed by the infrared-absorbing layer 320 thereby resonate in an optical resonance structure in which the support layer 310 is a lower reflecting layer, and the uppermost surface (interface) of the infrared-absorbing layer 320 is an upper reflecting layer. Since the support layer 310 having a larger surface area than the second plug 228 shown in FIG. 1 can thereby be used as a lower reflecting layer, the efficiency of infrared absorption by the infrared-absorbing layer 320 can be increased.

2.2 Method for Manufacturing Infrared Detector

Figure 6A:
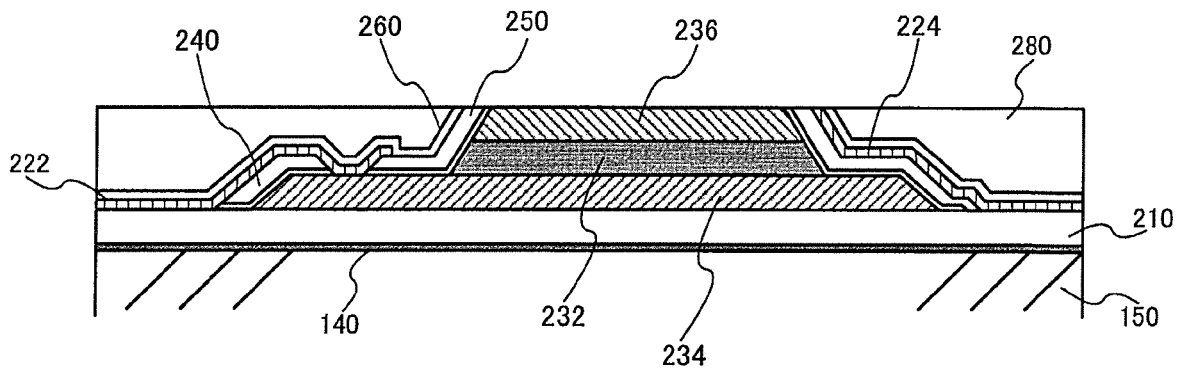
FIGS. 6A through 6C are simplified sectional views showing the second half of the steps for manufacturing the infrared detector shown in FIG. 5.
Figure 6B:
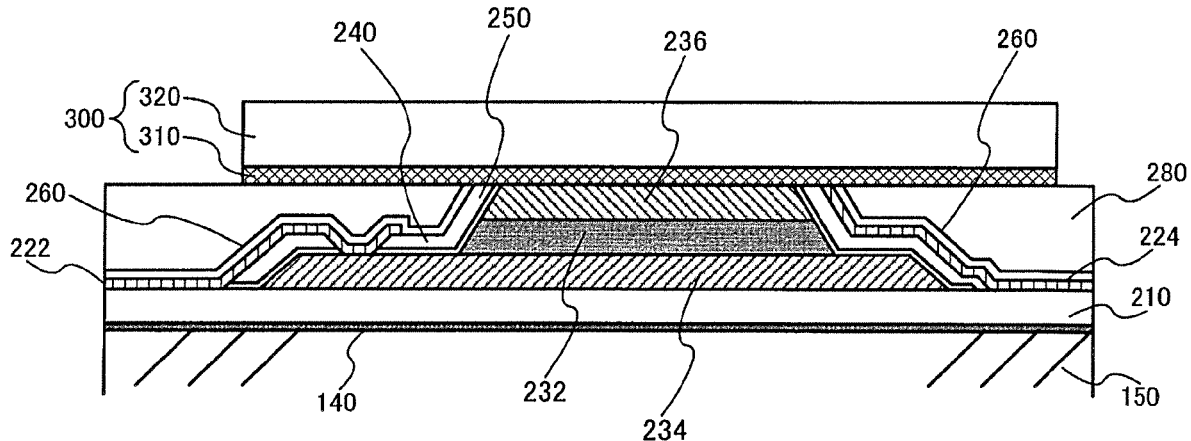
Figure 6C:
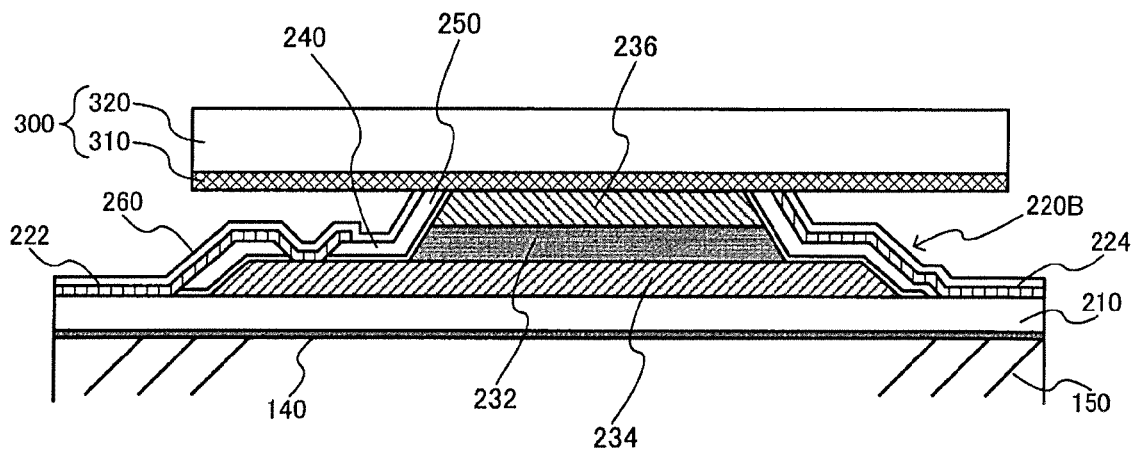

An infrared detection device having the infrared detector 200B shown in FIG. 5 as a single cell thereof, or an infrared detection device in which the infrared detector 200B shown in FIG. 5 is arranged in two dimensions as shown in FIG. 2, can be manufactured by the steps shown in FIGS. 3A through 3C, followed by the steps shown in FIGS. 6A through 6C, for example. The steps shown in FIGS. 3A through 3C are as described in the first embodiment, and will not be described below.

In FIG. 6A, the second sacrificial layer 280, the wiring layer 224, the second plug 228, the interlayer insulation layer 250, and the first and second reducing gas barrier layers 240, 260 shown in FIG. 3C are planarized by CMP or another method. A flat surface for forming the infrared-absorbing body 300 is thereby formed.

As shown in FIG. 6B, the support layer 310 composed of a metal, for example, is then formed on the entire surface by sputtering, for example, and the infrared-absorbing layer (e.g., SiO$_2$ layer or SiN layer) 320 is formed thereon by CVD or another method. The support layer 310 and the infrared-absorbing layer 320 are then patterned by photolithography. An infrared-absorbing body 300 having a surface area greater than the surface area of the capacitor 230 in plan view is thereby formed by patterning in each cell.

As shown in FIG. 6C, the second sacrificial layer 280 is then removed by isotropic etching by using hydrofluoric acid or the like, for example. At this time, the infrared-absorbing body 300 is protected by the functioning of the support layer 310 as an etching stop layer, and the infrared detection element 220B is also protected by the etching stop layer (second reducing gas barrier layer) 260. The portion of the lower surface of the infrared-absorbing body 300 not adjacent to the top part of the infrared detection element 220B thereby becomes a non-contacting surface having an undercut shape, and is thermally separated. Since the infrared-absorbing body 300 has a non-contacting surface in the portion not adjacent to the top part of the infrared detection element 220B, the collected heat is transferred to the capacitor 230 by solid heat conduction.

The support member 210 is subsequently patterned, and by using the open part 102A (see FIG. 2) thereby formed, the first sacrificial layer 150 beneath the support member 210 is removed by isotropic etching by hydrofluoric acid or the like, and the infrared detector 200B shown in FIG. 5 is thereby completed.

3. Third Embodiment

3.1 Structure of the Infrared-absorbing Body

Figure 7:
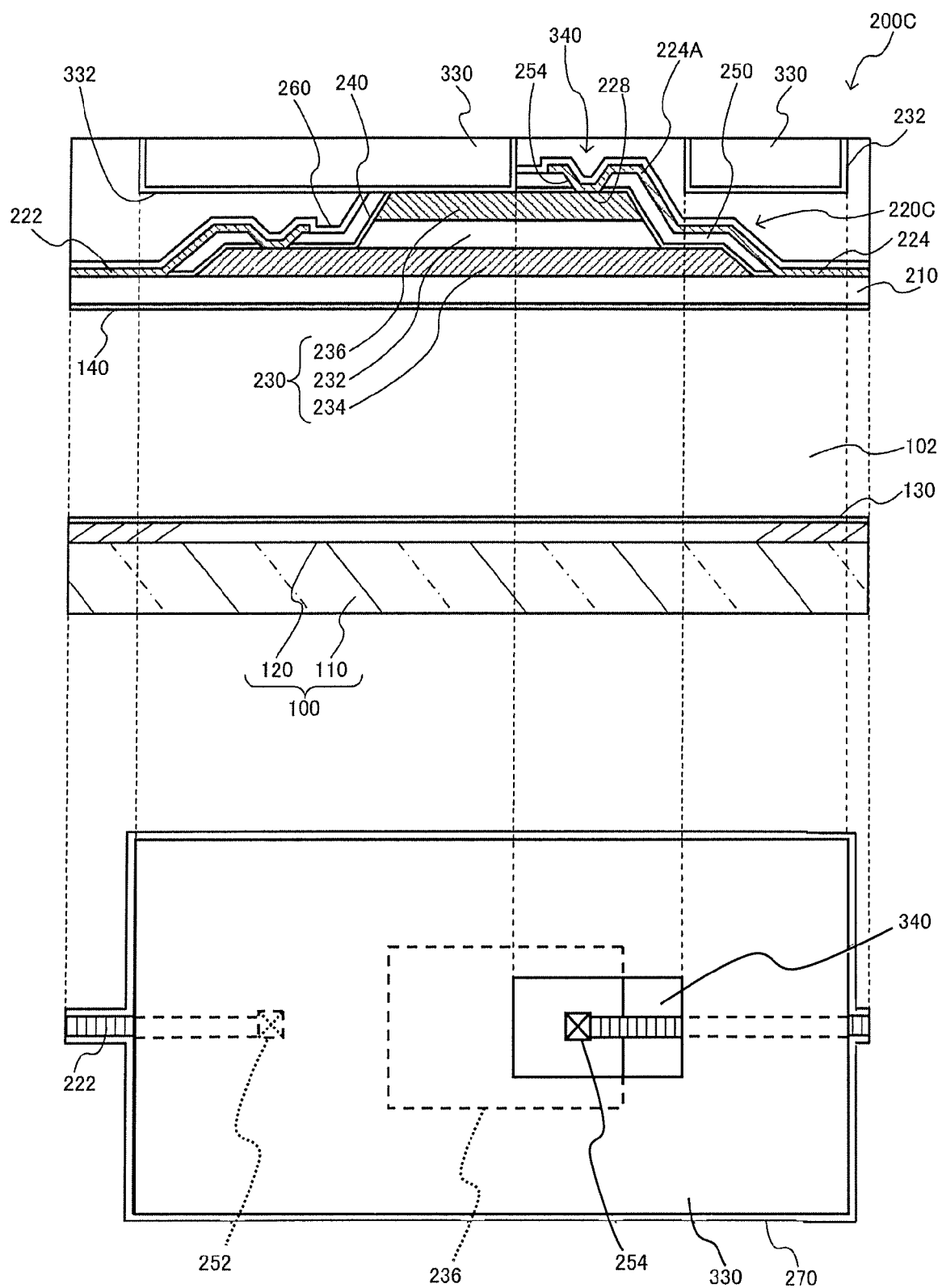
FIG. 7 is a simplified sectional view and simplified plan view showing the pyroelectric detector of one cell of the pyroelectric infrared detection device according to a third embodiment of the present invention.

FIG. 7 shows the infrared detector 200C according to a third embodiment. Members shown in FIG. 7 that have the same functions as members in FIG. 1 are referred to by the same reference symbols as in FIG. 1, and no detailed description thereof will be given.

The infrared detector 200C shown in FIG. 7 differs from the infrared detector 200A shown in FIG. 1 with respect to the infrared-absorbing body (one example of a light-absorbing member) 330 and the linking structure thereof. First, the second contact hole 254 formed in the interlayer insulation layer 250, and the contact region formed in the second plug 228 filled into the second contact hole 254 are preferably disposed in a position away from the center position of the second electrode 236 in plan view.

The infrared-absorbing body 330 is formed so as to cover the capacitor 230 in a region other than the wiring contact region in which the second plug 228 and the wiring layer 224A for covering the second plug 228 are formed in plan view. In other words, the region above the contact region formed by the second contact hole 254 and the second plug 228 filled into the second contact hole 254 is a hollow part 340 in which the infrared-absorbing body 330 is absent. The infrared-absorbing body 330 is thus a ring-shaped plate having the hollow part 340.

The infrared detection element 220C shown in FIG. 7 also may have the first reducing gas barrier layer 240, interlayer insulation layer 250, and second reducing gas barrier layer 260 on the periphery of the capacitor 230, the same as in the infrared detection element 220A shown in FIG. 1, although, in the plan view of FIG. 7, the second reducing gas barrier layer 260 is omitted for the sake of brevity. However, the interlayer insulation layer 250 covers the side surfaces of the capacitor 230 and a portion of the top part of the capacitor 230, and a portion of the second electrode 236 is not covered by the interlayer insulation layer 250. The exposed second electrode 236 and the infrared-absorbing body 330 are also linked.

In manufacturing, the bottom surface and inner and outer side surfaces of the infrared-absorbing body 330 having the hollow part 340 are sometimes covered by an etching stop layer 332. The etching stop layer 332 is, of course, unnecessary when the infrared-absorbing body 330 has high selectivity with respect to the etchant of the second sacrificial layer 280. In the present embodiment, the etching stop layer 332 is formed of an aluminum oxide $Al_2O_3$ layer, for example, and the etching stop layer 332 is thereby used as a third reducing gas barrier layer. The third reducing gas barrier layer 332 is also formed between the infrared-absorbing body 330 and the top surface of the second electrode 236 in the region not covered by the interlayer insulation layer 250. The top surface of the second electrode 236 in the region not covered by the interlayer insulation layer 250 is thereby covered by the third reducing gas barrier layer 332, and the penetration path of reducing gas from above the capacitor 230 can thereby be blocked.

Through the infrared detection element 220C shown in FIG. 7, the infrared-absorbing body 330 can be linked to the second electrode 236 without the presence of the second plug 228, the same as in FIG. 5, and wiring to the second electrode 236 can thus be connected to the wiring layer 224 via the second plug 228 which is filled into the second contact hole 254. The reliability of the wiring is therefore ensured.

3.2 Method for Manufacturing the Infrared Detector

Figure 8A:
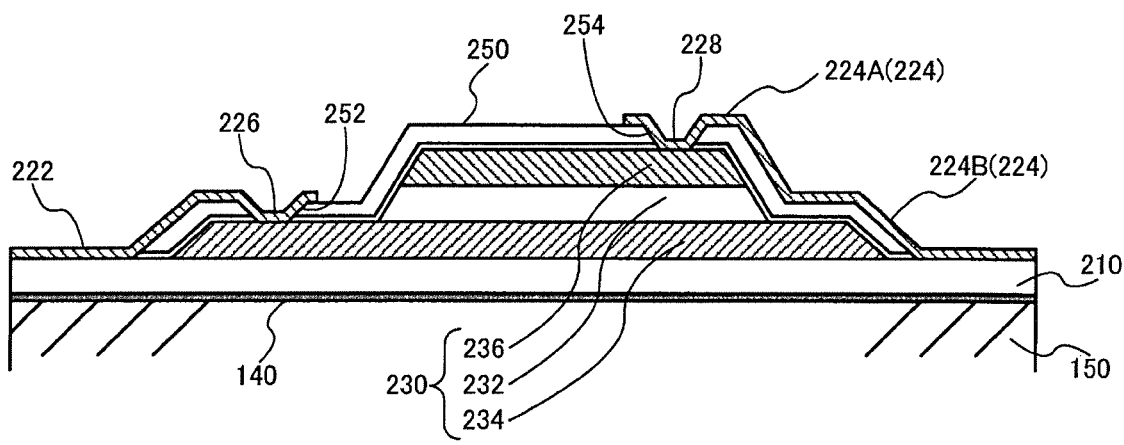
FIGS. 8A through 8C are simplified sectional views showing the first half of the steps for manufacturing the infrared detector shown in FIG. 7.
Figure 8B:
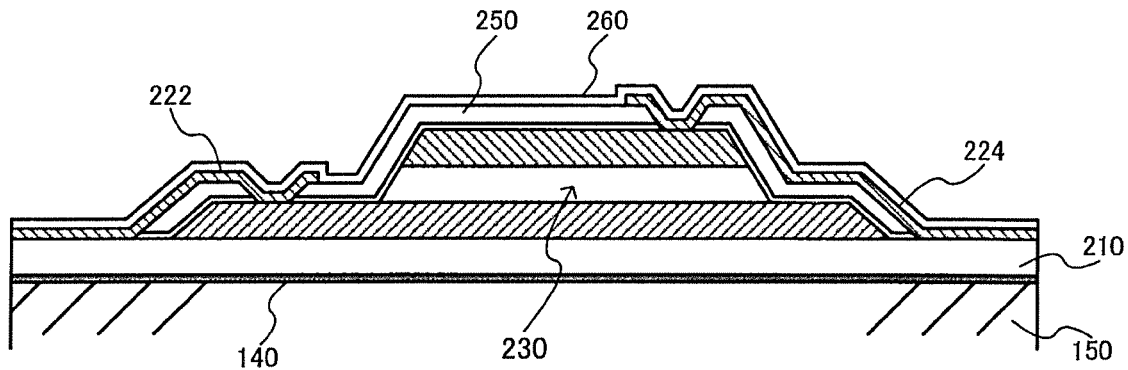
Figure 8C:
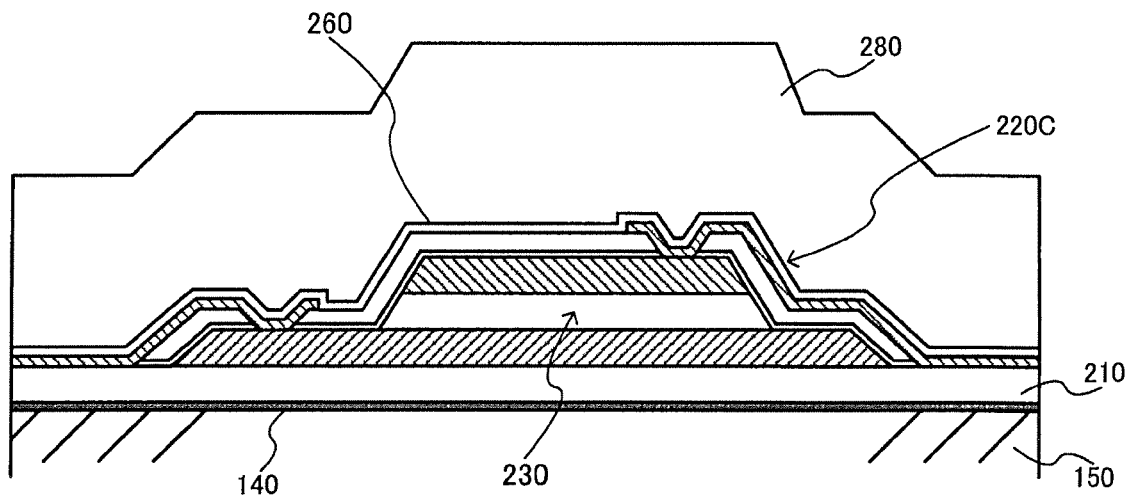

The method for manufacturing the infrared detector shown in FIG. 7 will be described with reference to FIGS. 8A through 8C and FIGS. 9A through 9D. FIGS. 8A through 8C show manufacturing steps that correspond to those shown in FIGS. 3A through 3C. FIGS. 8A through 8C differ from FIGS. 3A through 3C only in that the contact region formed by the second contact hole 254 formed in the interlayer insulation layer 250, and the second plug 228 filled into the second contact hole 254, is disposed in a position away from the center position of the second electrode 236 in plan view.

Figure 9A:
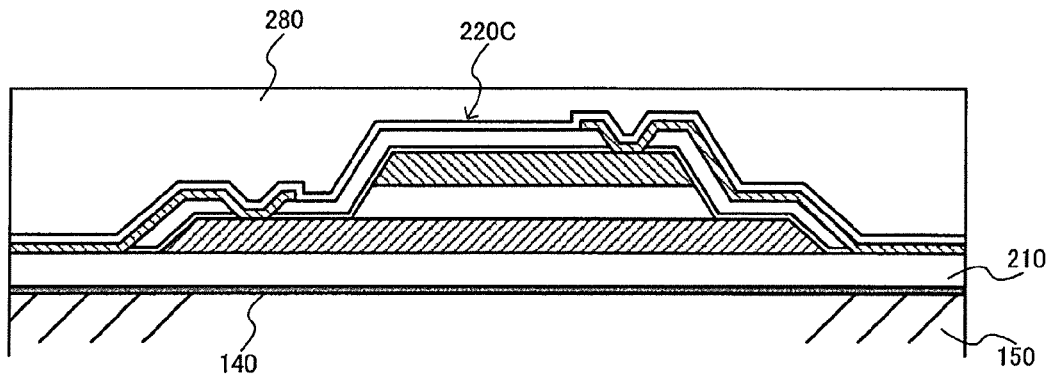
FIGS. 9A through 9D are simplified sectional views showing the second half of the steps for manufacturing the infrared detector shown in FIG. 7.

In the step of planarizing the second sacrificial layer 280 shown in FIG. 9A, unlike FIGS. 4A and 6A, the infrared detection element 220C is less exposed than the second sacrificial layer 280, and the entire flat surface is formed by only the second sacrificial layer 280.

Figure 9B:
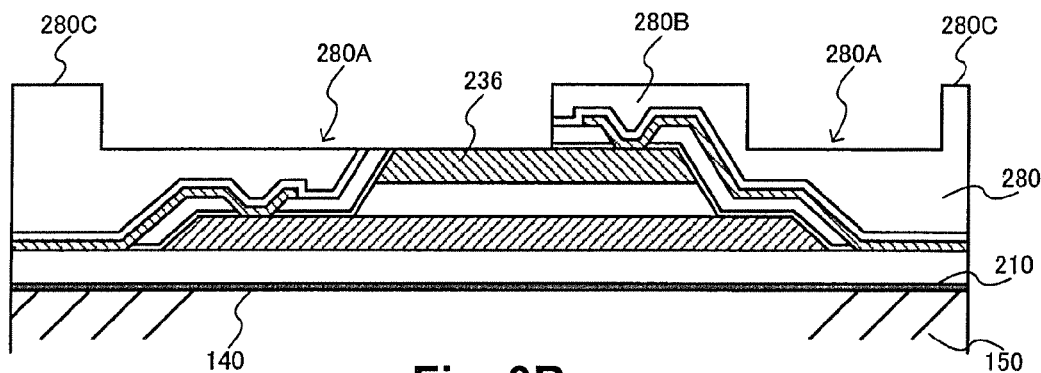

As shown in FIG. 9B, a portion of the second sacrificial layer 280 and a portion of the first and second reducing gas barrier layers 240, 260 and the interlayer insulation layer 250 are patterned and subsequently isotropically etched. The island-shaped non-etched region 280B and the etched region 280A surrounded by the peripheral non-etched region 280C correspond to the shape of the infrared-absorbing body 330 shown in FIG. 7. The shape of the island-shaped non-etched region 280B corresponds to the hollow part 340 in FIG. 7.

Figure 9C:
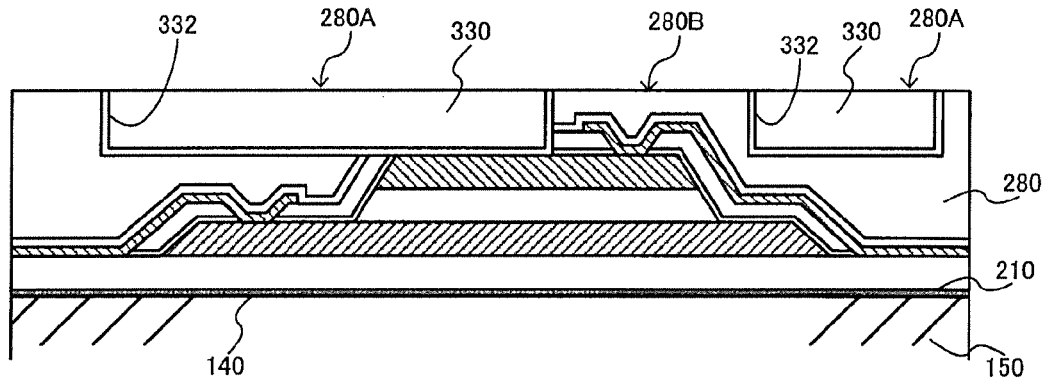

As shown in FIG. 9C, the etching stop layer 332 is then formed on the entire surface, the etching stop layer 332 on the non-etched regions 280B, 280C is removed, and the etching stop layer 332 is left only in the etched region 280A. The infrared-absorbing body 330 is then formed on the entire surface, and the infrared-absorbing body 330 on the non-etched regions 280B, 280C is removed and planarized.

Figure 9D:
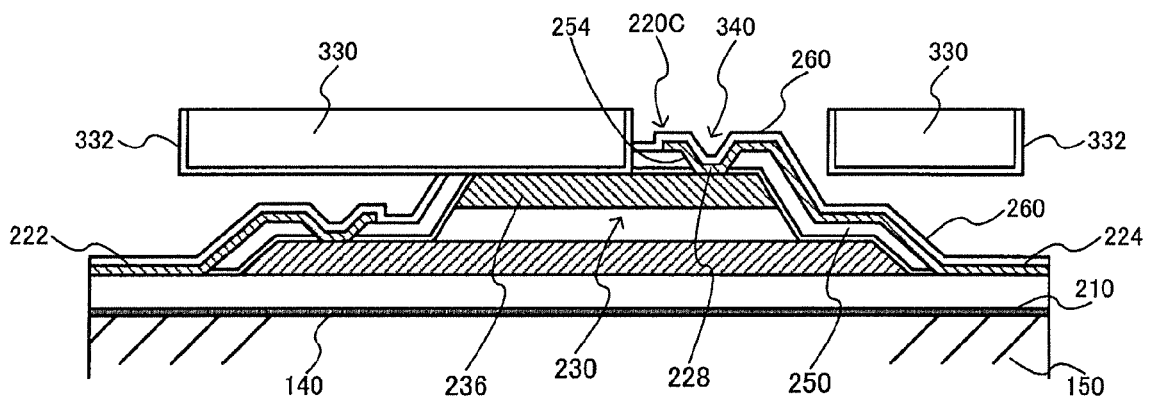

As shown in FIG. 9D, the second sacrificial layer 280 is then removed by isotropic etching using hydrofluoric acid or the like, for example. At this time, the infrared-absorbing body 330 is protected by the etching stop layer 332, and the infrared detection element 220C is also protected by the etching stop layer (second reducing gas barrier layer) 260. The hollow part 340 is thereby formed, and the portion of the lower surface of the infrared-absorbing body 300 and the etching stop layer 332 not adjacent to the top part of the infrared detection element 220C thereby becomes a non-contacting surface having an undercut shape, and is thermally separated. Since the infrared-absorbing body 330 and the etching stop layer 332 have a non-contacting surface in the portion not adjacent to the top part of the infrared detection element 220B, the collected heat is transferred to the capacitor 230 by solid heat conduction.

The support member 210 is subsequently patterned, and by using the open part 102A (see FIG. 2) thereby formed, the first sacrificial layer 150 beneath the support member 210 is removed by isotropic etching by hydrofluoric acid or the like, and the infrared detector 200C shown in FIG. 7 is thereby completed.

4. Electronic Instrument

Figure 10:
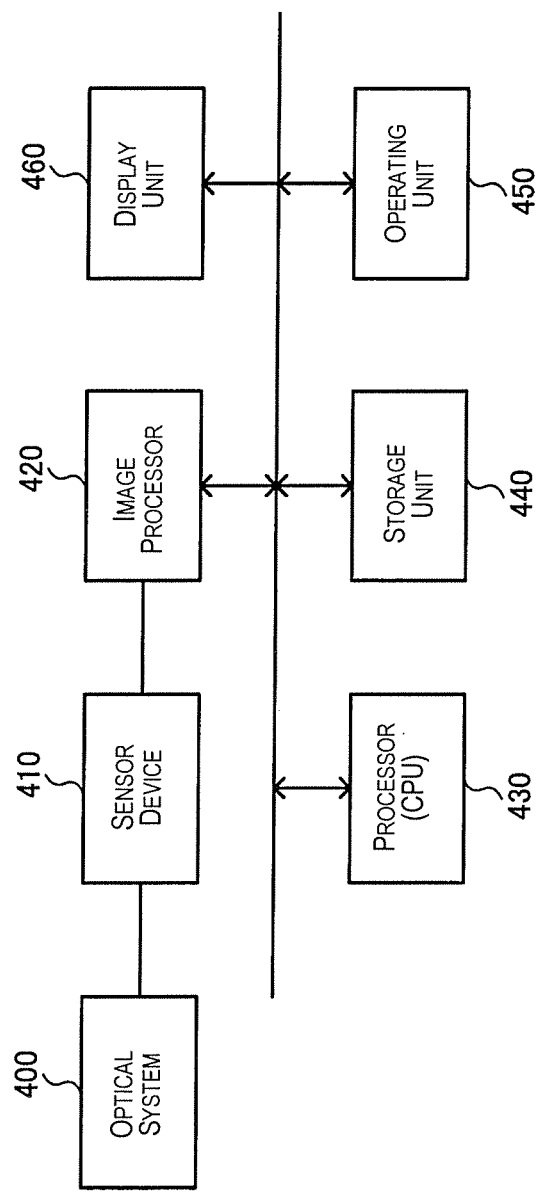
FIG. 10 is a block diagram showing the electronic instrument which includes the pyroelectric detector or pyroelectric detection device.

FIG. 10 shows an example of the configuration of an electronic instrument which includes the thermal detector or thermal detection device of the present embodiment. The electronic instrument includes an optical system 400, a sensor device (thermal detection device) 410, an image processor 420, a processor 430, a storage unit 440, an operating unit 450, and a display unit 460. The electronic instrument of the present embodiment is not limited to the configuration shown in FIG. 10, and various modifications thereof are possible, such as omitting some constituent elements (e.g., the optical system, operating unit, display unit, or other components) or adding other constituent elements.

The optical system 400 includes one or more lenses, for example, a drive unit for driving the lenses, and other components. Such operations as forming an image of an object on the sensor device 410 are also performed. Focusing and other adjustments are also performed as needed.

The sensor device 410 is formed by arranging the thermal detector 200A (200B, 200C) of the present embodiment described above in two dimensions, and a plurality of row lines (word lines, scan lines) and a plurality of column lines (data lines) are provided. In addition to the detector arranged in two dimensions, the sensor device 410 may also include a row selection circuit (row driver), a read circuit for reading data from the detector via the column lines, an A/D conversion unit, and other components. Image processing of an object image can be performed by sequentially reading data from detectors arranged in two dimensions.

The image processor 420 performs image correction processing and various other types of image processing on the basis of digital image data (pixel data) from the sensor device 410.

The processor 430 controls the electronic instrument as a whole and controls each block within the electronic instrument. The processor 430 is realized by a CPU or the like, for example. The storage unit 440 stores various types of information and functions as a work area for the processor 430 or the image processor 420, for example. The operating unit 450 serves as an interface for operation of the electronic instrument by a user, and is realized by various buttons, a GUI (graphical user interface) screen or the like, for example. The display unit 460 displays the image acquired by the sensor device 410, the GUI screen, and other images, for example, and is realized by a liquid crystal display, an organic EL display, or another type of display.

A pyroelectric detector of one cell may thus be used as an infrared sensor or other sensor, or the thermal detector of one cell may be arranged along two axes, e.g., two orthogonal axes, in two dimensions to form the sensor device 410, in which case a heat (light) distribution image can be provided. This sensor device 410 can be used to form an electronic instrument for thermography, night vision, a surveillance camera, or another application.

As shall be apparent, by using one cell or a plurality of cells of thermal detectors as a sensor, it is possible to form an analysis instrument (measurement instrument) for analyzing (measuring) physical information of an object, a security instrument for detecting fire or heat, an FA (factory automation) instrument provided in a factory or the like, and various other electronic instruments.

Figure 11A:
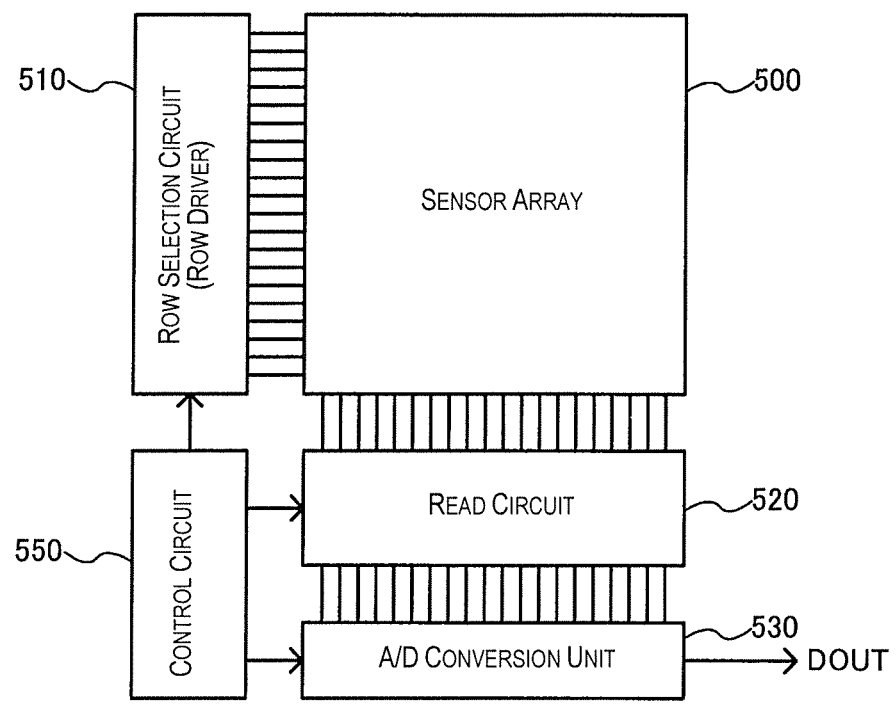
FIGS. 11A and 11B are views showing an example of the configuration of a pyroelectric detection device in which pyroelectric detectors are arranged in two dimensions.

FIG. 11A shows an example of the configuration of the sensor device 410 shown in FIG. 10. This sensor device includes a sensor array 500, a row selection circuit (row driver) 510, and a read circuit 520. An A/D conversion unit 530 and a control circuit 550 may also be included. An infrared camera or the like used in a night vision instrument or the like, for example, can be realized through the use of the sensor device described above.

A plurality of sensor cells is arrayed (arranged) along two axes as shown in FIG. 2, for example, in the sensor array 500. A plurality of row lines (word lines, scan lines) and a plurality of column lines (data lines) are also provided. The number of either the row lines or the column lines may be one. In a case in which there is one row line, for example, a plurality of sensor cells is arrayed in the direction (transverse direction) of the row line in FIG. 11A. In a case in which there is one column line, a plurality of sensor cells is arrayed in the direction (longitudinal direction) of the column line.

Figure 11B:
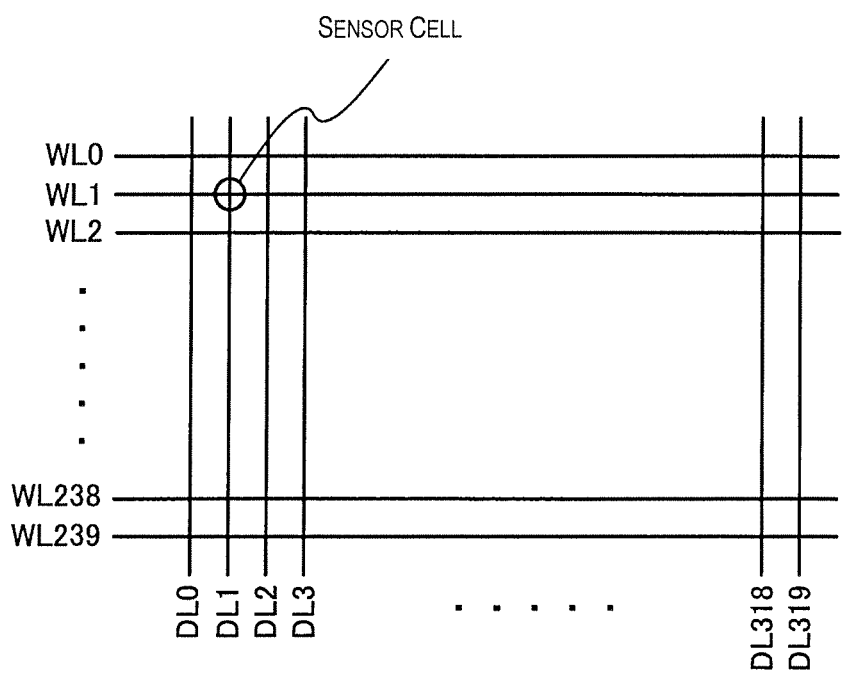

As shown in FIG. 11B, the sensor cells of the sensor array 500 are arranged (formed) in locations corresponding to the intersection positions of the row lines and the column lines. For example, a sensor cell in FIG. 11B is disposed at a location corresponding to the intersection position of word line WL1 and column line DL1. Other sensor cells are arranged in the same manner.

The row selection circuit 510 is connected to one or more row lines, and selects each row line. Using a QVGA (320×240 pixels) sensor array 500 (focal plane array) such as the one shown in FIG. 11B as an example, an operation is performed for sequentially selecting (scanning) the word lines WL0, WL1, WL2, . . . WL239. In other words, signals (word selection signals) for selecting these word lines are outputted to the sensor array 500.

The read circuit 520 is connected to one or more column lines, and reads each column line. Using the QVGA sensor array 500 as an example, an operation is performed for reading detection signals (detection currents, detection charges) from the column lines DL0, DL1, DL2, . . . DL319.

The A/D conversion unit 530 performs processing for A/D conversion of detection voltages (measurement voltages, attained voltages) acquired in the read circuit 520 into digital data. The A/D conversion unit 530 then outputs the A/D converted digital data DOUT. Specifically, the A/D conversion unit 530 is provided with A/D converters corresponding to each of the plurality of column lines. Each A/D converter performs A/D conversion processing of the detection voltage acquired by the read circuit 520 in the corresponding column line. A configuration may be adopted in which a single A/D converter is provided so as to correspond to a plurality of column lines, and the single A/D converter is used in time division for A/D conversion of the detection voltages of a plurality of column lines.

The control circuit 550 (timing generation circuit) generates various control signals and outputs the control signals to the row selection circuit 510, the read circuit 520, and the A/D conversion unit 530. A control signal for charging or discharging (reset), for example, is generated and outputted. Alternatively, a signal for controlling the timing of each circuit is generated and outputted.

Several embodiments are described above, but it will be readily apparent to those skilled in the art that numerous modifications can be made herein without substantively departing from the new matter and effects of the present invention. All such modifications are thus included in the scope of the present invention. For example, in the specification or drawings, terms which appear at least once together with different terms that are broader or equivalent in meaning may be replaced with the different terms in any part of the specification or drawings.

The present invention is broadly applicable to various thermal detectors (e.g., thermocouple-type elements (thermopiles), pyroelectric elements, bolometers, and the like) in which a physical characteristic changes based on temperature. The light detected may be of any wavelength. The absorption with respect to light (electromagnetic waves) and the wavelength dependency of thermal conversion efficiency of the light-absorbing member can also be utilized to perform adjustment so that only light of the desired wavelength spectrum (e.g., far infrared light, THz light) is detected.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A thermal detector comprising:
a thermal detection element that changes physical characteristics according to temperature;
a light-absorbing member configured and arranged to collect heat and to transmit collected heat to the thermal detection element, the light-absorbing member being a plate shaped member at least partially contacting a top part of the thermal detection element and having a portion overhanging to an outside from the top part of the thermal detection element in plan view;
a support member including a first side and a second side opposite from the first side with the thermal detection element being mounted on the first side and the second side facing a cavity, and the thermal detection element being disposed between the support member and the light-absorbing member; and
a support part supporting and linking to a portion of the second side of the support member.

2. The thermal detector according to claim 1, wherein
the thermal detection element is a pyroelectric detection element including a capacitor that changes an amount of polarization according to temperature, the capacitor including a first electrode, a second electrode, and a pyroelectric body disposed between the first electrode and the second electrode, and
the light-absorbing member has a surface area greater than a surface area of the capacitor of the pyroelectric detection element in plan view.

3. The thermal detector according to claim 2, wherein
the pyroelectric detection element further includes
a protective layer protecting an outer surface of the capacitor with the protective layer forming a contact hole passing through to the second electrode,
a plug filling the contact hole and having both electrical conduction properties and heat transfer properties, and
a wiring layer formed in a prescribed pattern on the protective layer and the plug, and
the light-absorbing member is linked to the second electrode via the plug and the wiring layer.

4. The thermal detector according to claim 3, wherein
the pyroelectric detection element further includes
a first reducing gas barrier layer disposed between the protective layer and an outer surface of the capacitor, and
a second reducing gas barrier layer covering the protective layer and the wiring layer.

5. A thermal detection device comprising:
a plurality of the thermal detectors according to claim 3 arranged in two dimensions along two intersecting axes.

6. The thermal detector according to claim 3, wherein
the plug is in contact with a region of the second electrode constituting 50% or more of a surface area of the second electrode in plan view.

7. A thermal detection device comprising:
a plurality of the thermal detectors according to claim 6 arranged in two dimensions along two intersecting axes.

8. The thermal detector according to claim 2, wherein
the pyroelectric detection element further includes
a protective layer covering a side surface of the capacitor and a portion of a top part of the capacitor with the protective layer forming a contact hole in a position corresponding to the top part of the capacitor,
a plug filling the contact hole and having electrical conduction properties, and
a wiring layer formed in a prescribed pattern on the protective layer and the plug, and
the light-absorbing member covers, in plan view, the capacitor in a region other than a wiring contact region in which the plug and the wiring layer covering the plug are disposed.

9. The thermal detector according to claim 8, wherein
the wiring contact region is disposed in a position away from a center position of the second electrode in plan view.

10. The thermal detector according to claim 8, wherein
the pyroelectric detection element further includes
a first reducing gas barrier layer disposed between the protective layer and an outer surface of the capacitor,
a second reducing gas barrier layer covering the protective layer and the wiring layer, and
a third reducing gas barrier layer disposed between the light-absorbing member and a region of a top surface of the second electrode not covered by the protective layer.

11. A thermal detection device comprising:
a plurality of the thermal detectors according to claim 2 arranged in two dimensions along two intersecting axes.

12. The thermal detector according to claim 1, wherein
the light-absorbing member includes
a plate-shaped support layer covering the top part of the thermal detection element and overhanging to the outside from the top part of the thermal detection element in plan view, and
a heat collection layer formed on the support layer.

13. A thermal detection device comprising:
a plurality of the thermal detectors according to claim 12 arranged in two dimensions along two intersecting axes.

14. The thermal detector according to claim 1, wherein
the thermal detection element is a pyroelectric detection element including a capacitor that changes an amount of polarization according to temperature, the capacitor including a first electrode, a second electrode, and a pyroelectric body disposed between the first electrode and the second electrode, and
the light-absorbing member includes
   a plate-shaped support layer covering a top part of the second electrode and overhanging to an outside from the top part of the second electrode with the support layer having a surface area greater than a surface area of the capacitor in plan view, and
   a heat collection layer formed on the support layer.

15. The thermal detector according to claim 14, wherein
the support layer is made of electrically conductive material, and
the pyroelectric detection element includes
   a protective layer covering a side surface of the capacitor, and
   a wiring layer formed in a prescribed pattern on the protective layer, the wiring layer being electrically connected to the second electrode via the support layer.

16. A thermal detection device comprising:
a plurality of the thermal detectors according to claim 15 arranged in two dimensions along two intersecting axes.

17. A thermal detection device comprising:
a plurality of the thermal detectors according to claim 14 arranged in two dimensions along two intersecting axes.

18. A thermal detection device comprising:
a plurality of the thermal detectors according to claim 1 arranged in two dimensions along two intersecting axes.

19. An electronic instrument comprising:
the thermal detection device according to claim 18.

20. An electronic instrument comprising:
the thermal detector according to claim 1.

* * * * *